April 2, 1957 L. SPRARAGEN 2,787,353
LOCKING AND CONTROL MEANS FOR SHAFTS
Filed Nov. 2, 1954 2 Sheets-Sheet 1
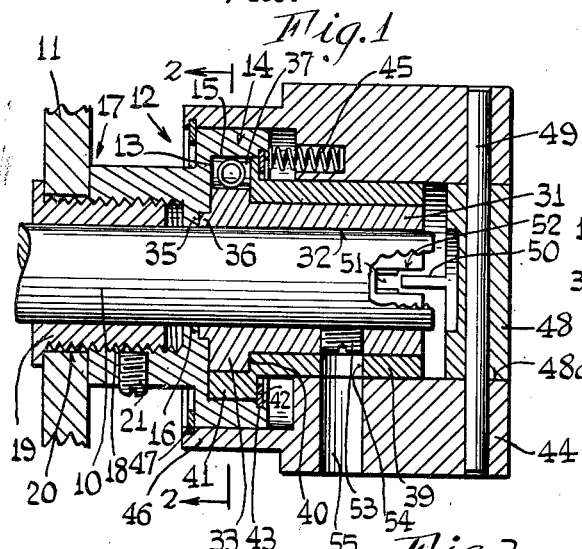
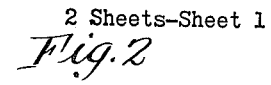
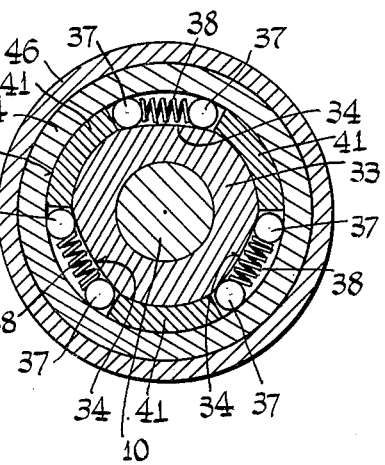
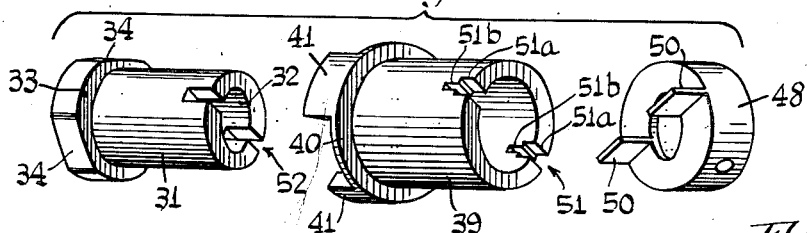
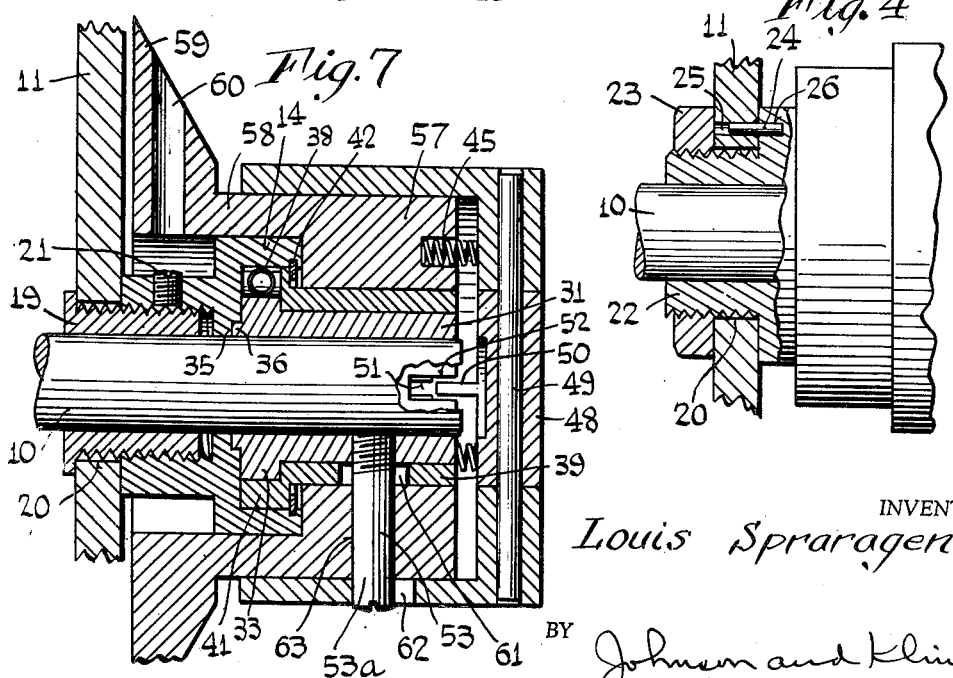
INVENTOR
Louis Spraragen
BY Johnson and Kline
ATTORNEYS April 2, 1957    L. SPRARAGEN    2,787,353
LOCKING AND CONTROL MEANS FOR SHAFTS
Filed Nov. 2, 1954    2 Sheets-Sheet 2
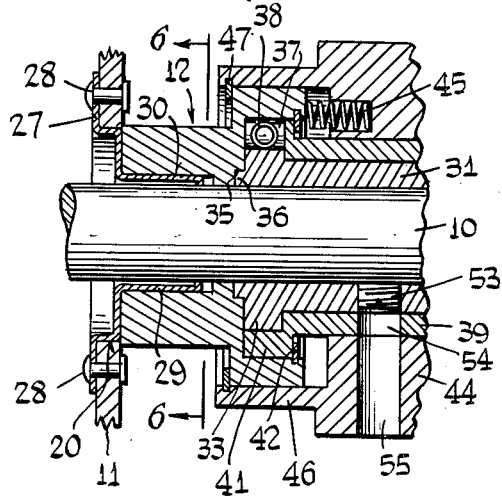
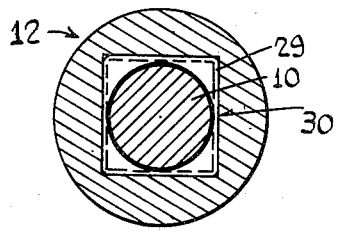
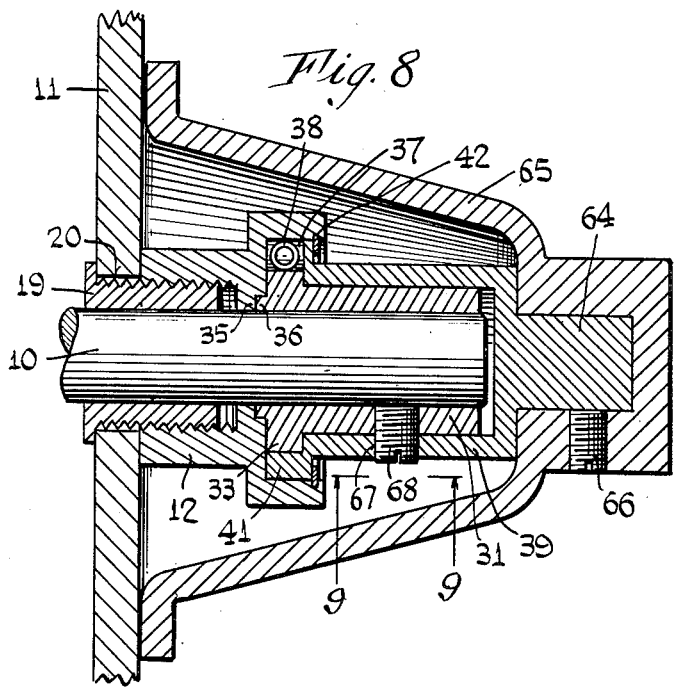
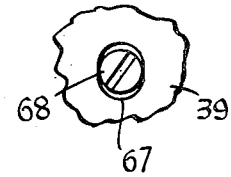
INVENTOR
Louis Spraragen
BY Johnson and Kline
ATTORNEYS United States Patent Office 2,787,353
Patented Apr. 2, 1957

2,787,353
LOCKING AND CONTROL MEANS FOR SHAFTS

Louis Spraragen, Fairfield, Conn., assignor to Automatic Locking Devices, Inc., Bridgeport, Conn., a corporation of Connecticut Application November 2, 1954, Serial No. 466,261

12 Claims. (Cl. 192—8)

This invention relates to means for adjusting and locking the operating shafts of precision instruments, machines or the like devices, and particularly to a unitary device adapted to be readily mounted on existing shafts.

It has long been a problem in precision instruments and the like, particularly those having Braille knobs which are identified by feel, that in attempting to identify the knob inadvertent rotation of the shaft is produced which changes the adjustment on the instrument. Also, vibration or inertia of parts connected to the shaft may tend to inadvertently cause the shaft to rotate from its predetermined adjusted position.

The present invention overcomes these difficulties by providing a locking device which will automatically hold the shaft in any desired position against inadvertent movement and which is preferably formed as a unit which may be mounted on the existing shaft without any substantial modification of the shaft. Preferably, the device is of such a character that the actuator must be moved inwardly to unlocking position before the shaft can be rotated so that persons feeling the Braille knobs cannot inadvertently alter the adjustment.

This is accomplished by providing a unit consisting of the fixed race which is adapted to be secured to the panel or other support on the instrument and having associated therewith the locking elements, locking cam, release member and knob, all of which can be secured to the shaft by a single fastening means such as a set screw.

A feature of the invention resides in the simplicity of construction and in the ease with which the device can be mounted on the instrument by a number of types of mounting means which may be provided to suit the specific application. If desired, an indicating means may be provided to accurately indicate the adjusted position of the shaft.

Other features and advantages of the invention will be apparent from the specification and claims when considered in connection with the drawings in which:

Figure 1 shows a longitudinal sectional view of one form of the invention.

Fig. 2 is a cross-sectional view taken along lines 2—2 of Fig. 1.

Fig. 3 is an exploded view of the cam release sleeve and driving member.

Fig. 4 is a fragmentary sectional view of another form of mounting means.

Fig. 5 is a longitudinal sectional view of another form of mounting means.

Fig. 6 is a transverse sectional view taken along lines 6—6 of Fig. 5.

Fig. 7 is a longitudinal sectional view showing the shaft position indicator.

Fig. 8 is another form of locking device.

Fig. 9 is a fragmentary view taken along lines 9—9 of Fig. 8.

As shown in Fig. 1, the locking device of the present invention is arranged to be mounted on an operating shaft 10 of an instrument or the like device which is adapted to project through a panel 11 or other support structure of the instrument, not shown. The locking device comprises a mounting member 12 having an outwardly facing cavity 13 in the outer end 14 thereof and in which the outer wall 15 of the cavity forms a race adapted to be positioned concentric with and in spaced relation with the shaft by bearing portion 16. The inner end 17 of the mounting means is adapted to be secured or fixed to the panel or supporting member and held against rotation.

This may be accomplished in many ways. For example, in the form of the invention shown in Fig. 1 the inner end of the mounting member is provided with a threaded bore 18 to be threaded by a bushing 19 extending through a hole 20 in the panel to clamp the mounting member in place thereon and it is fixed against rotation with respect to the panel and shaft by means of a set screw 21 or other suitable means.

Under some circumstances it may be desired to provide the mounting member with a reduced threaded neck 22, as shown in Fig. 4, which is adapted to be passed through the hole 20 in the panel and be secured in position by a suitable nut 23 or the like threaded on the inner face of the panel. A pin 24 inserted through a hole 25 in the panel and into a socket 26 in the mounting member holds the mounting member against rotation.

Another form of the mounting means is shown in Figs. 5 and 6 wherein a sheet metal member 27 is adapted to be secured to the panel by rivets 28 or the like fastening means so as to project into the hole 20 therein and is provided with a projecting neck 29 having an out-of-round configuration, herein illustrated as square, which is adapted to be inserted into a corresponding opening 30 in the bottom of the inner end of the mounting member to hold the mounting member on the panel against rotation thereon. In this form of the invention the unit being locked to the shaft, as will be explained, holds the mounting member in cooperative relation with the sheet metal bracket.

Cooperating with the race, as shown in Fig. 1, is a cam sleeve 31 having a bore 32 to receive the operating shaft 10. The cam sleeve is provided with a cam member 33 at its inner end having cam means thereon, herein illustrated as a plurality of cam surfaces 34. The inner end of the cam sleeve engages the bottom of the cavity so that the cam member is positioned within the race with the cam surfaces in predetermined spaced relation with the race. If desired, the bottom of the cavity can have a recess 35 to receive a projection on the cam sleeve 36 to insure proper positioning of the cam member within the race. As shown in Fig. 2, a pair of locking elements 37 are disposed between each of the cam surfaces. These locking elements may be cylindrical or spherical and are urged into binding relation by springs 38 interposed between each pair, as shown in Fig. 2, to normally lock the cam and race together.

In order to release the locking elements a second sleeve 39 is provided to surround and rotate on said cam sleeve. The second sleeve has a flange 40 at its inner end which is adapted to engage a shoulder formed by the side of the cam member so as to be positioned within the cavity and has projecting portions 41 extending into the cavity between the sets of locking elements, as shown in Fig. 2, to engage and release the locking elements when the second sleeve is rotated with respect to the cam sleeve. Preferably, the flange is located within the edge of the cavity and is locked therein by a fastening member 42 having one edge seated in a recess 43 in the wall of the cavity, as shown in Fig. 1. This secured-together assembly of the mounting means having the race, the cam, the locking elements and resilient means and the release member forms a single unit which can be readily assembled for use with knobs of various types.

The form of the invention shown in Fig. 1 is particularly adapted for use with Braille knobs which are felt for identification. The knob member 44 is slidably mounted on the second sleeve and is normally urged to a projected position by springs 45. The knob has a flange 46 which is interlocked with the mounting member by a fastener member 47 so as to limit its projection and also secure it to and form a part of said unit.

In order to operate the locking device of the present invention, the knob is provided with means operable when the knob is pushed inwardly against the spring to actuate the second sleeve to release the locking elements and then drive the cam sleeve therewith. While this means may take many forms, in the form of the invention shown in Figs. 1 and 3 the drive means comprises a disk-like element 48 mounted in the central bore 48a in the end of the knob and secured in position by a pin 49. The disk-like element is provided with spaced depending driver members 50 located on either side of the shaft and which are adapted to cooperate with slots 51, 52 formed in the ends of two sleeves, as shown in Figs. 1 and 3. The slot 51 in the second sleeve has a wide portion 51a at the end to permit slight lateral movement of the knob in its projected position. The inner end of the slot has a narrow driving portion 51b adapted to be engaged by the driver members when the knob is pushed in. The slot 52 of the cam sleeve or inner sleeve is for the full length thereof the full width of the outer end of the slot 51 in the second sleeve. The arrangement is such that the knob may be rotated slightly while in projected position without affecting the adjustment of the instrument. However, when the knob is pushed in so that the driver members 50 engage the narrow slot 51b, the second sleeve can be rotated relative to the cam sleeve for a limited amount. This causes the releasing elements 41 to engage the adjacent locking element and move it out of binding relation. Thereafter, the driver element also engages the wall of the slot 52 in the inner sleeve to rotate the cam sleeve with respect to the race. As soon as the knob is released, the cam sleeve is automatically locked against rotation in either direction and the knob is moved to its projected position wherein it is effective to unlock the locking device even though it may be contacted by the fingers, particularly when used with a Braille knob.

The unit can be secured to the shaft in any suitable manner so as to control its rotation. In the form of the invention shown in Fig. 1, the unit is secured to the shaft by connecting the cam sleeve to the shaft by means of a set screw 53 which is carried wholly within the cam sleeve so that it does not interfere with the relative movement of the second sleeve on the cam sleeve to release the locking elements. Aligned access holes 54, 55 are provided in the assembled second sleeve and knob through which a screw driver or other instrumentality may be inserted to tighten the set screw so that when the cam sleeve is driven incident to pushing in and turning the knob, the shaft will also be driven effecting the required adjustment of the shaft and instrumentalities connected thereto. Since all of the elements of the unit are locked together, the setting of this single fastening means will secure the entire unit to the shaft against separation therefrom.

Under some circumstances, it may be desired to show accurately the position of the shaft. This may be accomplished in many ways, for example, as illustrated in Fig. 7, by interposing between the second sleeve and knob an indicator member 57 in the form of a sleeve having a projecting portion or skirt 58 extending around the mounting member and provided with an indicating portion 59 adjacent the face of the panel. The indicating portion adjacent the panel may be provided with a hole 60 through which an instrument, such as a screw driver or the like, can be passed to engage the set screw 21 for locking the mounting member to the bushing 19. The knob in this form of the invention is normally urged to projected position and is stopped in the projected position by means of an extension 53a of the set screw 53 which extends through an enlarged aperture 61 in the second sleeve which permits limited rotation of the second sleeve on the cam sleeve and through an enlarged aperture 62 in the skirt of the knob, as shown in Fig. 7, the aperture 62 permitting limited longitudinal and rotative movement of the knob on the unit to effect the necessary movement of the knob to produce the release and drive of the shaft by the drive members 50. The portion of the set screw passing through the aperture 63 in the indicator sleeve, however, has a close fit so that the indicator member is fixed to the shaft by the set screw so that it accurately indicates the position of the shaft. Here again, with this construction, the locking device can be applied as a unit to existing shafts simply by mounting it on the bushing and setting the two set screws.

In the form of the invention shown in Fig. 8, the unit is provided with a slightly different operating knob. In this form of the invention the mounting means 12, cam sleeve 31, locking elements 37, spring 38 and the second sleeve 39 of the unit are locked together by the fastener 42 to form a unit. The second sleeve, however, is provided with a squared extension 64 to which the knob 65 is secured by set screw 66. The release sleeve in this form of the invention is provided with an elongate slot 67, shown in Fig. 9, which is adapted to cooperate with a set screw 68 passing through both the second sleeve and cam sleeve and secured to the shaft. With this construction, when the knob is turned the second sleeve is turned relative to the cam sleeve (the elongate slot permitting this limited movement of the second sleeve with respect to the cam sleeve) so that the release elements on the second sleeve can engage the locking elements and release them from binding action and thereafter drive the shaft when the set screw engages the end of the slot.

From the foregoing it will be seen that the present invention provides a control and locking device for shafts which embodies an assembled unit which can be easily and readily secured to shafts without substantial alteration of the shafts and handles therefor and which can be readily adapted to operate with various types of knobs as may be required to fulfill the needs of the device.

Variations and modifications may be made within the scope of the claims and portions of the improvements may be used without others.

I claim:

1. A control unit for the shaft of an instrument adapted to be mounted on the instrument panel to adjust and lock a rotatable shaft projecting therethrough comprising a mounting member adapted to be mounted on the panel to surround said shaft and having a cavity at the outer end, the wall of said cavity forming a race concentric with and in spaced relation to said shaft, a sleeve having means to secure the sleeve to the shaft and having cam means located within the cavity in spaced relation to the race, locking elements disposed between the cam means and race, resilient means normally urging the locking elements into binding relation with the race to hold the sleeve against rotation with respect to the race, a second sleeve rotatably mounted on the first sleeve and having a flange located in the cavity so as to overlie the locking elements and resilient means and provided with lock release means coacting with the locking elements for releasing the locking elements in response to predetermined relative rotation between said sleeves, and means including a fastener carried by the edge of the cavity and connecting the mounting means, sleeves, locking elements and resilient means together to form a unit.

2. A control unit for the shaft of an instrument adapted to be mounted on a panel to adjust and lock a rotatable shaft projecting therethrough comprising a mounting member adapted to be mounted on the panel to surround said shaft and having a cavity at the outer end, the wall of said cavity forming a race concentric with and in spaced relation to said shaft, a sleeve having means for securing said sleeve to the shaft and having a portion at its inner end engaging the bottom of the cavity and cam means thereon located within the race, locking elements disposed between the cam means and race, resilient means normally urging the locking elements into binding relation with the race to hold the sleeve against rotation with respect to the race, a second sleeve rotatably mounted on the first sleeve and having a flange located in the cavity so as to overlie the locking elements and resilient means and provided with lock release means coacting with the locking elements for releasing the locking elements in response to predetermined relative rotation between said sleeves, and means connected to the edge of the cavity and overlying the flange for holding the mounting means, sleeves, locking elements and resilient means together to form a unit.

3. A control unit for the shaft of an instrument adapted to be mounted on a panel to adjust and lock a shaft projecting therethrough comprising a mounting member adapted to be mounted on the panel to surround said shaft and having a cavity at the outer end, the wall of said cavity forming a race concentric with and in spaced relation to said shaft, a cam sleeve having means for securing the sleeve to the shaft and having its inner end engaging the bottom of the cavity and cam means thereon located within the race, locking elements disposed between the cam means and race, resilient means normally urging the locking elements into binding relation with the race to hold the sleeve against rotation with respect to the race, a second sleeve rotatably mounted on the first sleeve and having a flange located in the cavity so as to overlie the locking elements and resilient means and provided with lock release means coacting with the locking elements for releasing the locking elements in response to predetermined relative rotation between said sleeves, means interconnecting the flange and mounting member for holding the mounting member, sleeves, locking elements and resilient means together to form a unit, and means including a set screw accessible from the exterior of the unit and threaded into the cam sleeve for securing the cam sleeve and unit to the shaft.

4. The control unit as defined in claim 2 wherein an actuator means for the sleeves is mounted on the unit and is provided with means connecting said actuator means to said sleeves including a lost motion connection to one of said sleeves to cause relative rotation of said sleeves for a predetermined extent to release the locking elements and thereafter simultaneous rotation of said sleeves to rotate the shaft.

5. A control unit for the shaft of an instrument adapted to be mounted on the instrument panel to adjust and lock a rotatable shaft projecting therethrough comprising a mounting device having a race concentric with and in spaced relation to said shaft and adapted to be fixed to the panel, a cam sleeve having adjacent its inner end cam means located within the race, locking elements disposed between the cam means and race, resilient means normally urging the locking elements into binding relation with the race to hold the sleeve and connected shaft against rotation, a second sleeve rotatably mounted on the first sleeve and having lock release means at the inner end coacting with the locking elements for releasing the locking elements in response to predetermined relative rotation between said sleeves, means connecting said mounting device, sleeves, locking elements and resilient means together to form a unit, knob means mounted on the unit for limited longitudinal movement from an outer inoperative position to an inner operative position and limited rotative movement in the outer position with respect to said sleeves, said knob having means movable into engagement with said second sleeve in the operative position to cause rotation of said second sleeve with respect to said first sleeve for a predetermined extent to release the locking elements and thereafter engaging both sleeves for simultaneous rotation of said sleeves to rotate the shaft, and means including a set screw accessible from the exterior of the unit and threaded into the cam sleeve to secure the cam sleeve and the unit to the shaft.

6. A control unit for the shaft of an instrument adapted to be mounted on the instrument panel to adjust and lock a rotatable shaft projecting therethrough comprising a mounting member adapted to be mounted on the panel and having a cavity at the outer end, the wall of said cavity forming a race concentric with and in spaced relation to said shaft, a sleeve adapted to be secured to the shaft and having cam means thereon located within the race, locking elements disposed between the cam means and race, resilient means normally urging the locking elements into binding relation with the race to hold the sleeve against rotation with respect to the race, a second sleeve rotatably mounted on the first sleeve and having a flange located in the cavity so as to overlie the locking elements and resilient means and provided with lock release means coacting with the locking elements for releasing the locking elements in response to predetermined relative rotation between said sleeves, means connected to the edge of the cavity and overlying the flange for holding the mounting means, sleeves, locking elements and resilient means together to form a unit, and knob means mounted on the unit for limited longitudinal movement from an outer inoperative position to an inner operative position and limited rotative movement in the outer position with respect to said sleeves, said knob having means movable into engagement with said second sleeve in the operative position to cause rotation of said second sleeve with respect to said first sleeve for a predetermined extent to release the locking elements and thereafter engaging both sleeves for simultaneous rotation of said sleeves to rotate the shaft, said knob means having a depending skirt extending over said sleeves and having means interlocking with said unit to prevent separation of the knob from said unit.

7. A control unit for the shaft of an instrument adapted to be mounted on the instrument panel to adjust and lock a rotatable shaft projecting therethrough comprising a race concentric with and in spaced relation to said shaft and fixed to the panel, a cam sleeve adapted to be secured to the shaft and having adjacent its inner end cam means located within the race, locking elements disposed between the cam means and race, resilient means normally urging the locking elements into binding relation with the race to hold the sleeve and connected shaft against rotation, a second sleeve rotatably mounted on the first sleeve and having lock release means at the inner end coacting with the locking elements for releasing the locking elements in response to predetermined relative rotation between said sleeves, and knob means on the unit mounted for limited longitudinal movement from an outer inoperative position to an inner operative position and limited rotative movement in the outer position with respect to said sleeves, said knob having drive means movable into engagement with said second sleeve in the operative position to cause rotation of said second sleeve with respect to said first sleeve for a predetermined extent to release the locking elements and thereafter engaging both sleeves for simultaneous rotation of said sleeves to rotate the shaft.

8. The invention as defined in claim 7 wherein the knob is normally urged by yielding means to said outer position and the drive means comprises narrow driver members projecting from the knob and corresponding slots in the ends of the sleeves, the slot in the second sleeve having a narrow driving portion at the inner end to receive the driver members when the knob is moved longitudinally inwardly against the yielding means, and the slot in the cam sleeve being wider than the driver portion whereby rotation of the knob in the inner position rotates the second sleeve relative to the cam sleeve to release the locking elements and the driver members then engage the walls of the slot in the cam sleeve to pick up said sleeve and rotate the same and the shaft connected thereto.

9. A control unit for the shaft of an instrument adapted to be mounted on the instrument panel to adjust and lock a rotatable shaft projecting therethrough comprising a race concentric with and in spaced relation to said shaft and fixed to the panel, an inner sleeve secured to the shaft and having adjacent its inner end cam means located within the race, locking elements disposed between the cam means and race, resilient means normally urging the locking elements into binding relation with the race to hold the sleeve and connected shaft against rotation, a second sleeve rotatably mounted on the first sleeve and having lock release means at the inner end coacting with the locking members for releasing the locking members in response to predetermined relative rotation between said sleeves, actuator means mounted on the unit and having means to connect said sleeves so as to cause relative rotation of said sleeves for said predetermined extent to release the locking elements and thereafter simultaneous rotation of said sleeves to rotate the shaft, and a shaft position indicator connected to said inner sleeve to project beyond the knob to indicate the adjusted and locked position of the shaft.

10. A control unit for the shaft of an instrument adapted to be mounted on a panel to adjust and lock a rotatable shaft projecting therethrough comprising a mounting member adapted to be mounted on the panel and having a cavity at the outer end, the wall of said cavity forming a race concentric with and in spaced relation to said shaft, a sleeve adapted to receive the shaft and having cam means thereon located within the race, locking elements disposed between the cam means and race, resilient means normally urging the locking elements into binding relation with the race to hold the sleeve against rotation with respect to the race, a second sleeve rotatably mounted on the first sleeve and having a flange located in the cavity so as to overlie the locking elements and resilient means and provided with lock release means coacting with the locking elements for releasing the locking elements in response to predetermined relative rotation between said sleeves, means connected to the edge of the cavity and overlying the flange for holding the mounting means, sleeves, locking elements and resilient means together to form a unit, an indicator sleeve surrounding said second sleeve, and fastening means passing through the sleeves for securing the inner sleeve and indicator sleeve together and to the shaft, said second sleeve having an enlarged hole therein to provide for said relative rotation between said inner and second sleeves.

11. A control unit for the shaft of an instrument adapted to be mounted on a panel to adjust and lock a rotatable shaft projecting therethrough comprising a mounting member adapted to be mounted on the panel and having a cavity at the outer end, the wall of said cavity forming a race concentric with and in spaced relation to said shaft, a cam sleeve adapted to be secured to the shaft and having a portion at its inner end engaging the bottom of the cavity and cam means thereon located within the race, locking elements disposed between the cam means and race, resilient means normally urging the locking elements into binding relation with the race to hold the sleeve against rotation with respect to the race, a second sleeve rotatably mounted on the cam sleeve and having a flange located in the cavity so as to overlie the locking elements and resilient means and provided with lock release means coacting with the locking elements for releasing the locking elements in response to predetermined relative rotation between said sleeves, means connected to the edge of the cavity and overlying the flange for holding the mounting means, sleeves, locking elements and resilient means together to form a unit, knob means mounted on the unit against separation therefrom and for limited longitudinal and rotative movement with respect to said sleeves and having means movable into engagement with said second sleeve to cause rotation of said second sleeve with respect to said first sleeve for said predetermined extent to release the locking elements and thereafter engaging both sleeves for simultaneous rotation of said sleeves to rotate the shaft, said knob means having a depending skirt extending over said sleeves, and a shaft position indicator interposed between the skirt and sleeves and secured to rotate with the inner sleeve and having means extending beyond the skirt to indicate the position of the shaft to which the inner sleeve is secured.

12. A control unit for the shaft of an instrument adapted to be mounted on a panel to adjust and lock a shaft projecting therethrough comprising a mounting means having a race concentric with and in spaced relation to said shaft and fixed to the panel, a sleeve secured to the shaft and having adjacent its inner end cam means located wtihin the race, locking elements disposed between the cam means and race, resilient means normally urging the locking elements into binding relation with the race to hold the sleeve and connected shaft against rotation, a second sleeve rotatably mounted on the first sleeve and having lock release means at the inner end coacting with the locking elements for releasing the locking elements in response to predetermined relative rotation between said sleeves, means interconnecting the mounting means and a flange on the second sleeve to secure the mounting means, sleeves, locking elements and resilient means to form an assembled unit, and knob means secured to the second sleeve to rotate the same, said second sleeve having an enlarged aperture and a set screw threaded into the first sleeve to secure the first sleeve to the shaft and having a portion of the set screw disposed in the aperture whereby rotation of said second sleeve with respect to said first sleeve by said knob for said predetermined extent releases the locking elements and thereafter the walls of the aperture engage the set screw for simultaneous rotation of said sleeves and the shaft.

References Cited in the file of this patent

UNITED STATES PATENTS

| | | |
|---|---|---|
| 2,066,167 | Schwartz | Dec. 29, 1936 |
| 2,341,647 | Parkhurst | Feb. 15, 1944 |
| 2,414,341 | Spraragen | Jan. 14, 1947 |
| 2,475,159 | Spraragen | July 5, 1949 |
| 2,502,915 | Atkins | Apr. 4, 1950 |
| 2,633,213 | Hamplain | Mar. 31, 1953 |
| 2,670,824 | Banker | Mar. 2, 1954 |

FOREIGN PATENTS

| | | |
|---|---|---|
| 672,890 | France | Sept. 24, 1929 |